July 23, 1940.    A. RONNING    2,209,095
VEHICLE SUSPENSION
Filed Jan. 11, 1939
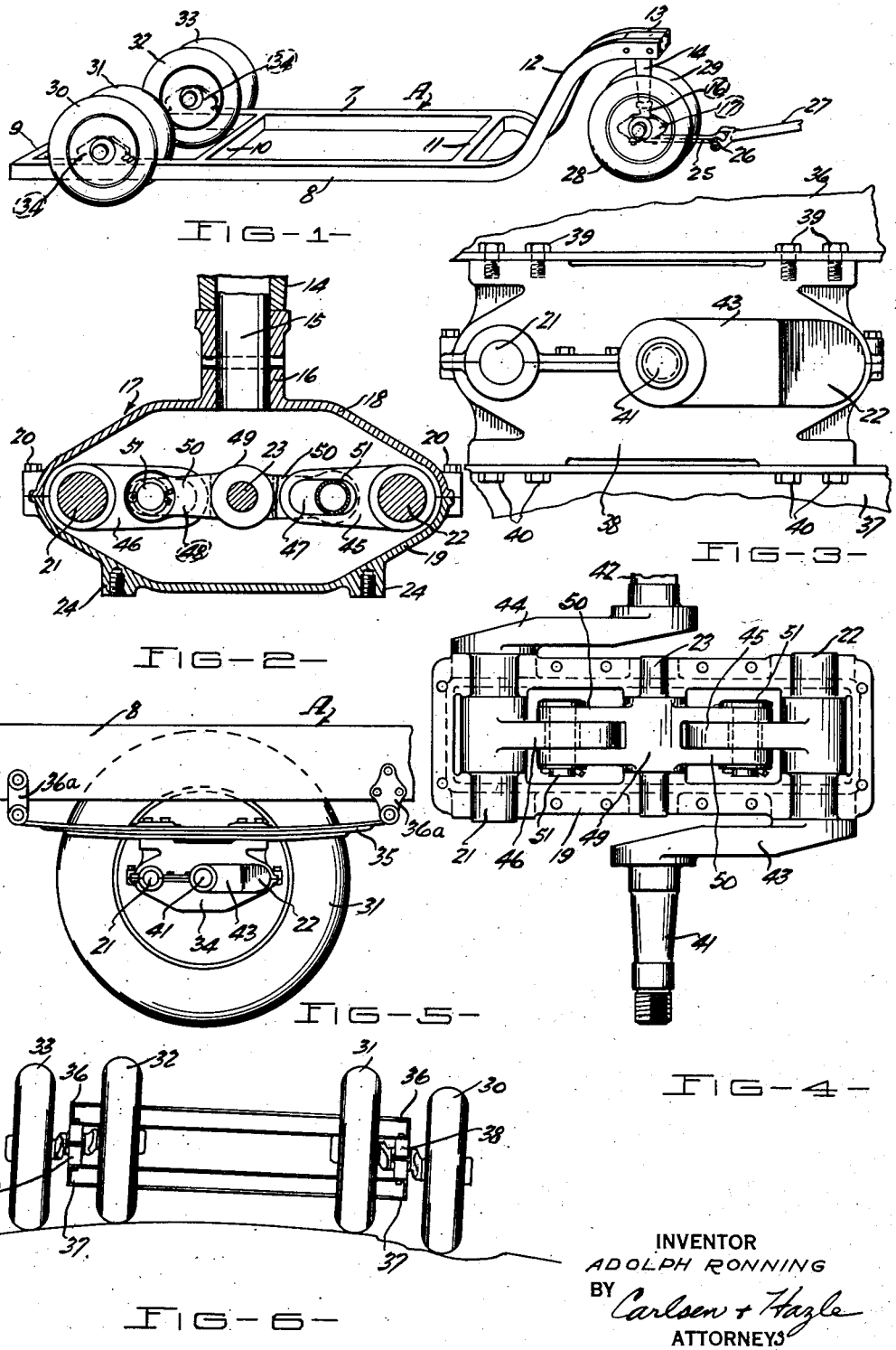
INVENTOR
ADOLPH RONNING
BY Carlsen + Hazle
ATTORNEYS Patented July 23, 1940

2,209,095

UNITED STATES PATENT OFFICE 2,209,095

VEHICLE SUSPENSION

Adolph Ronning, Minneapolis, Minn.

Application January 11, 1939, Serial No. 250,345

16 Claims. (Cl. 280—81)

This invention relates to differentially adjustable wheel suspension devices and arrangements for land vehicles and the primary object is to provide wheel mounting apparatus so constructed that it will permit the several supporting wheels to travel over raised and depressed ground surface conditions without correspondingly raising and lowering the supported part of the vehicle, and to so arrange the respective supporting units that the entire vehicle will be subjected to minimum fluctuation in stability as it is propelled over irregular ground surfaces during its course of travel. These and other more detailed and specific objects will be disclosed in the course of the following specification, reference being had to the accompanying drawing, illustrating preferred embodiments of the invention, and in which—

Fig. 1 is a perspective side elevation of a trailer type vehicle embodying my invention, and including compensating wheel suspension units attached to and supporting both front and rear ends of the vehicle frame.

Fig. 2 is an enlarged sectional elevation taken centrally and longitudinally through the housing and differential mechanism of the forward steerable unit.

Fig. 3 is a side elevation of one of the rear differential units, with the ground wheels removed, and with the housing slightly modified to permit attachment to and between upper and lower vehicle frame beams.

Fig. 4 is a plan view of the differential mechanism used in all of the presently disclosed units, and as seen when the upper housing section is removed.

Fig. 5 is a side elevation showing how the wheel mounting unit may be attached to a vehicle spring.

Fig. 6 is a transverse sectional elevation of a vehicle provided with laterally arranged compensating units embodying my invention and illustrating how the several wheels thereof are free to follow ground surface irregularities without interfering with the full and properly equalized distribution of vehicle weight thereto.

Referring to the drawing more particularly and by reference characters, A designates the main frame of a vehicle which, in the present instance, is of the trailer type, and, as shown in Fig. 1, embodies side beams 7 and 8 connected by rigid cross beams 9, 10, and 11. The fore ends of the beams 7—8 are goose-necked upwardly as at 12 for attachment to a block 13 from which rigidly depends a vertical sleeve 14. A post 15 (Fig. 2) is journaled in the sleeve 14, for steerable rotation or oscillation about a vertical axis, and is rigidly secured at its lower end in the neck 16 of a housing 17 having upper and lower sections 18 and 19, respectively, which are horizontally divided but normally rigidly attached to each other by bolts 20. Crank shafts 21 and 22, and an intermediate lever fulcrum shaft 23 are journaled transversely in the housing, with half bearings formed in the sections at the plane of separation, so that the shafts and their associated parts can be readily removed and replaced in the bearings by merely separating the housing sections, as will be evident from a consideration of Fig. 4. The lower housing section, 19, is provided with longitudinally spaced lugs 24 to which a forwardly extending bar 25 is attached, and the frontal end of this bar is hinged, as at 26, to a draft bar 27 for connection to a truck, tractor, or other draft means (not shown). As the unit thus described is free to turn on the vertical axis of post 15 in sleeve 14 it will be obvious that the front end of the trailer will be steerable in response to changes in direction by the pulling means acting through members 25 and 27, and this action will in turn also control directional changes in the front supporting wheels 28 and 29 which are mounted and interconnected in a manner presently to be described.

The rear supporting wheels 30, 31, 32, and 33 are arranged in laterally disposed pairs, with each pair having one wheel inside and the other outside of the respective longitudinal frame bars 7 and 8. This arrangement not only spreads the imposed load to four transversely spaced points of ground contact, but results in several other advantages among which may here be mentioned that tires for each inner wheel may be changed without first removing or in any way disturbing its companion outer wheel.

The differential casings 34 for the wheels 30—33 are not steerable with respect to frame A, as in the case of the frontal unit, and are merely bolted down upon the top surfaces of the frame beams 7 and 8. Where spring suspensions are desired the casings 34 may be reversed, as shown in Fig. 5, in which event they are bolted up to leaf spring assemblies 35, which are in turn secured to the beams of frame A by conventional end connections or shackles 36a. Where the vehicle frame includes vertically spaced pairs of beams 36 and 37, as shown in Figs. 3 and 6, the somewhat modified form of housing 38 is bolted to both beams as at 39 and 40.

While I have of necessity illustrated several forms of housing construction to adapt my invention to various vehicle structure conditions, I have only illustrated one design of compensating or differential mechanism. Before describing this mechanism, however, it may be noted that other somewhat similarly functioning mechanisms which might be substituted therefor, form the subjects-matter of my copending companion applications Serial No. 219,369, filed July 15th, 1938; Serial No. 242,726, and Serial No. 242,725 filed November 28th, 1938; Serial No. 244,019, filed December 5th, 1938; Serial No. 247,608, filed December 24th, 1938; and Serial No. 250,344 filed January 11th, 1939.

In the present disclosure the ground wheels 28 and 29 (or 30—31, or 32—33) are mounted on normally coaxial spindles 41 and 42 of cranks 43 and 44 that are rigid with and extend rearwardly and forwardly, respectively, from the shafts 22 and 21 (Fig. 4). Within the housing the crank shafts 22 and 21 have rigid arms 45 and 46, respectively, that extend longitudinally and horizontally toward each other, and are provided with slotted openings 47 and 48. At a point intermediate or between the shafts 22 and 21 the shaft or pin 23 tiltably supports a lever 49 having bifurcated arms 50 which embrace or straddle the arms 45 and 46 and have pins 51 engaging the slots 47—48. The mechanism thus described will be operative not only to equally distribute the imposed load to both wheels but will, simultaneously therewith, cause the wheels to move in opposite vertical directions with respect to the main frame so that they will have uniform ground contact when passing over irregularities and will always maintain the frame level at a mean or average level between the wheels. Thus, if the wheel 28 on crank 43 drops for instance into a four inch deep road surface cavity, while the level of the other wheel (29) remains constant, then the lever 49 will translate the movement into a relatively reverse or up movement to crank 44, with a result that the level of shaft 23 will assume the intermediate position (between levels of spindles 41 and 42) and therefore the supported frame part will be lowered only two inches. The increased advantage of this feature when employed in two or three supporting units for the same vehicle frame will be obvious, and will be particularly noticeable in the way of equalizing tire wear on trailers used for hauling heavy loads over roads that are either rutted or so noticeably rounded that relatively fixed wheels would not uniformly contact the road surface.

While I have only illustrated a vehicle frame in a general way, it will be understood that such frame, either in the illustrated or modified form, may be used for numerous purposes and may be incorporated in various types of vehicles including house trailers, truck trailers, bogies, gun carriages, road graders, loaders, plows, etc.

It is further understood that suitable modifications may be made in the invention as herein described, provided they come within the spirit and scope of the appended claims. Having now therefore illustrated and described preferred embodiments of the invention, what I claim to be new and desire to protect by Letters Patent is:

1. A vehicle comprising a frame supported at least in part by two pairs of wheels arranged in transverse axial alignment when resting on a flat surface, said frame having side beams each disposed between the wheels of a pair, cranks connecting the wheels to the beams and permitting vertical oscillation of the wheels when traveling over irregular surfaces, while restraining angling movement of the wheels in a horizontal plane with respect to the beams, and differentially acting means connecting pairs of said cranks whereby the cranks of each pair will be oscillated in opposite vertical directions.

2. A vehicle comprising a frame having side beams, four axially aligned wheels supporting the frame with two wheels disposed at opposite sides of each beam, cranks connecting the respective wheels to the beams for oscillating movements in vertical planes while restraining angling movements of the wheels in a horizontal plane with respect to the beams, and means connecting the cranks at each side of the frame causing them to oscillate in opposite directions.

3. A vehicle comprising a frame, four cranks provided, respectively, with integral shafts journaled on the frame whereby the cranks may oscillate in transversely spaced vertical planes, ground wheels mounted directly upon and supporting the respective cranks, and differential acting means directly connecting certain pairs of said shafts to transmit torque action from one to the other and oscillate the cranks thereof in opposite vertical directions.

4. A vehicle having a frame, a housing mounted on the frame in a manner preventing any relative movement of the housing in a horizontal plane, a pair of wheel supported cranks having shafts journaled in the housing whereby the cranks may oscillate in transversely spaced vertical planes, and means differentially connecting the shafts within the housing causing them to oscillate the cranks in opposite vertical directions.

5. A vehicle having a frame, a housing mounted on the frame in a manner preventing relative angling movement of the housing in a horizontal plane, a pair of wheel supported cranks having shafts journaled in the housing whereby the cranks may oscillate in transversely spaced vertical planes, and means differentially connecting the shafts within the housing causing them to oscillate the cranks in opposite vertical directions, said housing having two sections separable in a plane passing through the crank shafts.

6. In a vehicle, a housing secured thereto for yieldable vertical movement but held against angling movement in a horizontal plane, wheel supported cranks extending from the housing, and differential acting means within the housing for moving the cranks in opposite vertical directions.

7. In a vehicle having a frame, a housing, vertically yieldable means securing the housing to the frame, a pair of wheel supported members mounted in the housing and operative to permit vertical movement of the wheels in transversely spaced vertical planes, and differential means within the housing interconnecting the members to move the wheels in opposite vertical directions.

8. A vehicle wheel assembly unit comprising a pair of wheel supported cranks having shafts journaled to the vehicle, normally aligned arms extending from the shafts, and lever acting means connecting the arms to translate the up movement of one crank into a down movement of the other crank.

9. A device for differentially mounting two wheels to a vehicle comprising a pair of cranks supported by the wheels and extending in opposite directions to vehicle bearings which are spaced longitudinally with respect to each other, and a horizontally disposed lever having connections with the cranks to translate the vertical movement of one crank into an opposite vertical movement of the other.

10. In a vehicle, a mounting member, a pair of wheel supported cranks secured to the member for oscillation in transversely spaced planes, arms rigidly associated with the respective cranks and extending therefrom in generally opposite directions, a lever fulcrumed with respect to the mounting member and connected with said arms to differentially actuate them in opposite directions.

11. A vehicle comprising a frame, four cranks provided, respectively, with integral shafts journaled on the frame whereby the cranks may oscillate in transversely spaced planes, ground wheels supporting the respective cranks, and differential acting means directly connecting certain pairs of said shafts to transmit torque action from one to the other and oscillate the cranks thereof in opposite directions.

12. A vehicle having a frame, a housing mounted on the frame in a manner preventing any relative movement of the housing in a horizontal plane, a pair of wheel supporting cranks having shafts journaled in the housing whereby the cranks may oscillate in transversely spaced planes, and means differentially connecting the shafts within the housing causing them to oscillate the cranks in opposite directions.

13. A vehicle having a frame, a housing mounted on the frame in a manner preventing relative angling movement of the housing in a horizontal plane, a pair of wheel supported cranks having shafts journaled in the housing whereby the cranks may oscillate in transversely spaced planes, and means differentially connecting the shafts within the housing causing them to oscillate the cranks in opposite directions, said housing having two sections separable in a plane passing through the crank shafts.

14. In a vehicle, a housing secured thereto for yieldable vertical movement but held against angling movement in a horizontal plane, wheel supported cranks extending from the housing, and differential acting means within the housing for moving the cranks in opposite directions.

15. In a vehicle having a frame, a housing, vertically yieldable means securing the housing to the frame, a pair of wheel supported members mounted in the housing and operative to permit movement of the wheels in transversely spaced planes, and differential means within the housing interconnecting the members to move the wheels in opposite directions.

16. A device for differentially mounting two wheels to a vehicle comprising a pair of cranks supported by the wheels and extending in opposite directions to vehicle bearings which are spaced longitudinally with respect to the direction of travel, and a lever and connections between the lever and the cranks operative to translate up and down movements of one crank into opposite movements of the other crank.

ADOLPH RONNING.